(No Model.)
S. F. HALL.
LIFTING JACK.
No. 425,785. Patented Apr. 15, 1890.
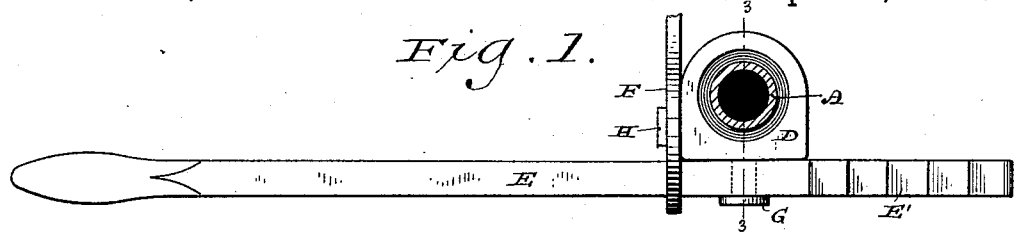
Fig. 1.
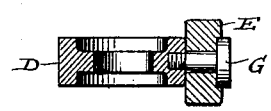
Fig. 3.
Fig. 2.
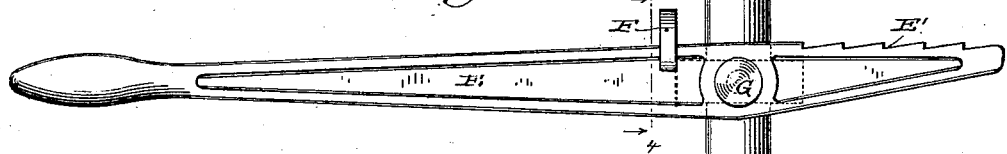
Fig. 4.
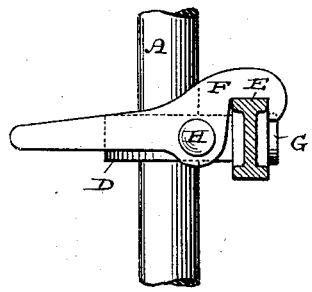
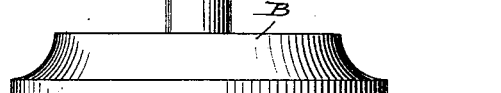
Witnesses
Geo. W. Young.
N. E. Oliphant.
Inventor
Spencer F. Hall
By H. G. Underwood
Attorney

UNITED STATES PATENT OFFICE.

SPENCER F. HALL, OF RACINE, WISCONSIN.

LIFTING-JACK.

SPECIFICATION forming part of Letters Patent No. 425,785, dated April 15, 1890.

Application filed February 19, 1890. Serial No. 341,012. (No model.)

*To all whom it may concern:*

Be it known that I, SPENCER F. HALL, of Racine, in the county of Racine, and in the State of Wisconsin, have invented certain new and useful Improvements in Lifting-Jacks; and I do hereby declare that the following is a full, clear, and exact description thereof.

My invention relates to lifting-jacks; and it consists in certain peculiarities of construction and combination of parts to be hereinafter described with reference to the accompanying drawings and subsequently claimed.

In the drawings, Figure 1 represents a plan view of my device with the standard thereof in horizontal section on line 1 1 of the succeeding figure; Fig. 2, a side elevation; Fig. 3, a transverse section on line 3 3, Fig. 1, the standard being omitted; and Fig. 4, a detail elevation, partly in section, on line 4 4 of Fig. 2.

Referring by letter to the drawings, A represents the standard of my device, this standard being preferably provided with a base B and hand-grip C. Loosely arranged on the standard A is a collar D, and pivotally connected to this collar is a lever E and latch F, said lever and latch being at right angles to each other. As shown in Fig. 3, the pivot G of the lever E is detachably connected to the collar D, and the pivot H of the latch F may be likewise connected to said collar; or the latter and both pivots may be in one piece.

The collar D and parts connected thereto are moved up or down with relation to the standard A, and the lever E moved on its pivot G to bring the notched end E' under the object to be lifted. By bearing down on the handle portion of the lever E the weight of the object to be lifted causes the collar D to bind on the standard A at the point to which said collar has been adjusted, and said lever being brought to a horizontal position the latch F is engaged therewith to hold the parts in the relation shown by Fig. 2.

The latch F is pivoted to the collar D so as to have a preponderance of weight on that side of the pivot H farthest from the lever, and thus when the handle portion of said lever is depressed to bring the latter out of the horizontal position shown in Fig. 2 said latch will automatically disengage, and the object that has been held up by the lever may be lowered.

The collar D may be run up on the standard A, and the lever E turned on its pivot to hang parallel with said standard, whereby the device will occupy but little space when not in use.

The standard A is preferably hollow, and may be made of gas-pipe, the hand-grip C being attached thereto in any suitable manner.

Having thus described my invention, what I claim as new, and desire to secure by Letters Patent, is—

1. A lifting-jack comprising a standard, a collar loose thereon, a lever pivoted to the collar, and a latch also pivoted to said collar in position to be brought into engagement with the lever, substantially as set forth.

2. A lifting-jack comprising a standard having a base and hand-grip, a collar loose on the standard, a lever pivoted to the collar, and a latch also pivoted to said collar at right angles to the lever, substantially as set forth.

In testimony that I claim the foregoing I have hereunto set my hand, at Racine, in the county of Racine and State of Wisconsin, in the presence of two witnesses.

SPENCER F. HALL.

Witnesses:
J. C. BROOKER,
J. G. TEALL.